(12) United States Patent
Drew et al.

(10) Patent No.: US 11,498,716 B2
(45) Date of Patent: Nov. 15, 2022

(54) APPLICATION OF LINERLESS LABELS (71) Applicant: Linermist Limited, Great Dunmow (GB)

(72) Inventors: Bruce Michael Drew, Great Dunmow (GB); Michael John Cooper, Colchester (GB); David Nicholas Edwards, Atlanta, GA (US)

(73) Assignee: Linermist Limited, Great Dunow (GB)

( * ) Notice: Subject to any disclaimer, the term of this patent is extended or adjusted under 35 U.S.C. 154(b) by 0 days.

(21) Appl. No.: 16/982,621

(22) PCT Filed: Mar. 26, 2019

(86) PCT No.: PCT/EP2019/057537
§ 371 (c)(1),
(2) Date: Sep. 21, 2020

(87) PCT Pub. No.: WO2019/185606
PCT Pub. Date: Oct. 3, 2019

(65) Prior Publication Data
US 2021/0024239 A1 Jan. 28, 2021

(30) Foreign Application Priority Data

Mar. 28, 2018 (GB) ................................. 1805069
Jun. 4, 2018 (GB) ................................. 1809084

(51) Int. Cl.
*B65C 9/00* (2006.01)
*C09J 7/32* (2018.01)
(Continued)

(52) U.S. Cl.
CPC .......... *B65C 9/0015* (2013.01); *B65C 9/1803* (2013.01); *B65C 9/1896* (2013.01);
(Continued)

(58) Field of Classification Search
CPC ... B65C 9/0015; C09J 7/38; C09J 7/32; Y10T 156/1057; Y10T 156/1062
See application file for complete search history.

(56) References Cited

U.S. PATENT DOCUMENTS 6,124,417 A 9/2000 Su
9,593,262 B2 * 3/2017 Henderson .......... B29C 65/4805
(Continued)

FOREIGN PATENT DOCUMENTS

WO 2007015264 2/2007
WO 2015029049 3/2015

*Primary Examiner* — George R Koch
*Assistant Examiner* — Christopher C Caillouet
(74) *Attorney, Agent, or Firm* — Stephen T. Scherrer; Monique A. Morneault; Scherrer Patent & Trademark Law, P.C.

(57) ABSTRACT

A method of applying a linerless label to an article wherein a web of joined labels is die cut from a web of label material in which the adhesive is protected by a water-soluble coating which provides a cushion between an anvil and die cutting means. The water-soluble coating is at least partially removed by exposure to water in a press following die-cutting, in a label applicator, or in an off-line unit. The web of joined labels may be wound and unwound between each of the above options. The web of joined labels may be separated in a label applicator by breaking a weakened boundary between adjoining labels or by cutting at a boundary between the label and the adjoining label. The linerless label may contain anti-counterfeit means that may be subsequently identified overtly and/or covertly.

20 Claims, 4 Drawing Sheets (51) Int. Cl.
*C09J 7/10* (2018.01)
*B65C 9/18* (2006.01)
*B65C 9/46* (2006.01)
*B65H 35/08* (2006.01)
*G09F 3/10* (2006.01)
*B65C 9/20* (2006.01)
*B65C 9/22* (2006.01)
*C09J 7/30* (2018.01)
*C09J 7/38* (2018.01)
*G09F 3/02* (2006.01)

(52) U.S. Cl.
CPC .............. *B65C 9/20* (2013.01); *B65C 9/2273* (2013.01); *B65C 9/46* (2013.01); *B65H 35/08* (2013.01); *C09J 7/10* (2018.01); *C09J 7/30* (2018.01); *C09J 7/32* (2018.01); *C09J 7/38* (2018.01); *G09F 3/10* (2013.01); *B65C 2009/0018* (2013.01); *B65H 2301/5112* (2013.01); *B65H 2701/192* (2013.01); *B65H 2801/75* (2013.01); *C09J 2203/334* (2013.01); *C09J 2301/208* (2020.08); *C09J 2301/302* (2020.08); *C09J 2301/306* (2020.08); *C09J 2429/00* (2013.01); *C09J 2475/00* (2013.01); *G09F 2003/026* (2013.01); *G09F 2003/0241* (2013.01); *G09F 2003/0242* (2013.01); *G09F 2003/0267* (2013.01); *G09F 2003/0269* (2013.01); *Y10T 156/1062* (2015.01)

(56) References Cited

U.S. PATENT DOCUMENTS

| | | | |
|---|---|---|---|
| 2005/0255298 A1* | 11/2005 | Crum | C09J 7/38 428/195.1 |
| 2012/0061014 A1 | 3/2012 | Patel | |
| 2016/0186013 A1 | 6/2016 | Henderson | |
| 2018/0240369 A1* | 8/2018 | Mallya | B65C 9/22 |
| 2020/0307143 A1* | 10/2020 | Drew | B32B 29/02 |

* cited by examiner

APPLICATION OF LINERLESS LABELS

The present invention concerns the production and application of linerless labels.

BACKGROUND OF INVENTION

A standard pressure sensitive label material has a multi-laminate structure composed of four critical elements: a face or face-stock (typically a paper or filmic substrate), an adhesive (typically a pressure sensitive adhesive), a release liner system, commonly comprising a silicone coating on a paper or polymeric liner. This label material, which is commonly produced in roll form, is converted into individual labels, which may then be applied to an article by an end-user, via the following typical process steps:

i. The upper surface is printed with information and graphics, commonly describing and advertising the product contained within the article to be labelled. This printing is typically done on a continuous (roll-to-roll) narrow web press producing many labels across and along the web of the label material.

ii. The upper parts (face material and adhesive) of the label material are then die-cut to produce individual labels carried in roll form supported by the release liner. Typically, but not necessarily, die-cutting is performed on the same asset (typically known as a press) as that used to print the labels.

iii. The printed die-cut label material is then slit to provide single lanes of labels and these slit rolls are then sent to an end-user who will affix the labels to articles via a dispensing process described in (iv) below.

iv. Labelling occurs at the end user by feeding the die-cut label material to a dispensing machine wherein labels are removed one at a time from the release liner and applied to the articles to be labelled. The release system allows the adhesive-backed labels which require a minimum level of stiffness, to be removed easily from the liner. This is typically a continuous operation running at high speeds (30-1,000 labels per minute) in which articles to be labelled are presented continuously to the dispensing point where they are labelled.

v. The liner, coated with a release system, becomes a waste stream. This waste stream is collected on a rewind stand following dispensing and may subsequently be land-filled or sold into low value reprocessing.

The above process has existed for more than 50 years, and whilst it has undergone continuous improvement throughout this time with, for example, the use of thinner face and liner materials and the use of lower coat weights for the adhesive and release system, the basic construction has remained unchanged. During this time frame, the industry has developed enormous scale with the adhesive often coated on a wide web (up to 2-3 meters in width) of release coated liner at very high speeds, often well in excess of 1,000 meters per minute. The adhesive, coated on the release coated liner, is laminated to the face (filmic substrate or paper) web in the same process, forming the label material which is supplied to printer/converters. Most label materials are manufactured this way through what is commonly known as a transfer coating process, so called because the adhesive is transferred to the face material from the release liner.

The adhesive can also be directly coated on the face material, followed by laminating with the release coated liner, commonly known as a direct coating process. That said, for many years, the industry has sought to find ways to effect labelling of pressure sensitive materials without using a liner and associated release system, thus significantly improving material and supply chain efficiencies, reducing cost, and eliminating an increasingly problematic waste stream. The so called 'linerless' solution has proved to be very elusive. Typically, approaches to linerless solutions have fallen into one of two broad categories, "Activatable Labels" and "Liner-free Labels".

Activatable Labels involve applying a specialty coating or cover layer to the adhesive system (essentially replacing the liner and the release system) or employing an adhesive system which is non-tacky at room temperature. In these solutions, a separate process, just prior to labelling, either removes the coating or cover layer to 'unmask' the adhesive, or activates the adhesive through an external stimulus such as heat or liquid. Activatable labels are supplied to the end user in a non-tacky state, and activated, i.e. the adhesive is exposed or activated to a tacky state just prior to application to the intended article. Activatable labels are printed prior to activation. By far, the most common activation scheme utilizes heat activation.

Whilst activatable label schemes do indeed eliminate the liner and the release system, and, therefore eliminate a waste stream, they replace them with another, often more expensive material, add complexity, and do not meaningfully improve cost. The cost issues arise from the use of expensive components in a specialty coating which masks the adhesive, or from the use of expensive additives or process to create a non-tacky adhesive. The requirement for additional process assets to remove the coating or activate the adhesive adds further cost to the overall solution, and separating an individual label at the point of dispensing remains challenging without the use of a carrier web. As discussed, earlier approaches to separating each label at the dispensing point exist, but add cutting complexity and the cost of such activatable label solutions do not justify end-users engaging in this additional complexity.

Due to the complex formulations needed to render an activatable adhesive non-tacky when wound in a reel, the adhesive after activation is commonly hazy in appearance which we define in this context as less than transparent. If the adhesive is hazy, a meaningful part of the label market, the so-called 'clear-on-clear' label, cannot be provided. In clear-on-clear systems, a label comprising a clear printed filmic substrate and a clear adhesive is applied to an article and, due to the transparency of the clear printed filmic substrate and clear adhesive, only the print is evident allowing a consumer to see product beneath the label. If the adhesive is hazy, then the appearance of the label becomes unacceptable.

Liner-free labels, while eliminating the liner, retain a silicone release system, and thus do not fully deliver the potential cost reduction. A liner-free system typically begins with printing of the face stock and then applying a release system (typically silicone based UV cured under a nitrogen blanket) to the printed face before coating the reverse side with a pressure sensitive adhesive to create a self-wound label material that does not include a liner. Typically a self-wound label material is produced on narrow web presses using an expensive adhesive, often a UV-cured hot melt, at a speed considerably lower (well below 1,000 meters per minute) than that used in conventional adhesive coating described above. The cost accumulation of lower scale, higher cost adhesive, and the continued use of a silicone release system mean that much, and sometimes all, of the cost benefit relative to the traditional process of eliminating the liner, is lost. The application of a silicone release coating to the printed face, either directly or by over-lamination of a clear filmic release liner, limits decorative options, for example tactile screen print or special varnishing effects.

Since the label printer is required to make additional investments to apply a conventional silicone release system and coat the adhesive, alternative processes have been developed whereby a clear release liner supplied as part of a conventional label material is transferred from the adhesive side of the face stock and then laminated over the printed face in either a modified narrow web press or a separate finishing machine, before die cutting or slitting the web to produce individual reels of labels. An example of such an alternative process may be found in Ritrama patent number EP2958743B1. Depending on the logistics, this process may provide a lower production cost solution for the printer. However, it only delivers minimal overall savings based on use of thinner face materials and also restricts decorative options.

A further challenge facing such a liner-free approach is to create individual labels from the label material (hereinafter referred to either as 'singulation' or 'separation') at the point of dispensing by the end user. Since there is no liner to carry the pre-die-cut labels to the dispensing point, singulation can only occur at the point of dispensing. One approach to this challenge is offered by ETI Converting Equipment ("ETI"). After creating the self-wound printed reel of labels, ETI deals with the singulation issue by using a temporary re-usable liner at the dispensing point. This allows a label to be die cut from the web in the label applicator, separated, and subsequently carried to the dispensing head by the temporary re-usable liner. This reduces the cost benefit of the ETI solution since a liner is re-introduced, adding complexity to die-cutting, and transferring to the end user the task of die-cutting perfectly repeatable shaped labels, currently the responsibility of the label printer/converter.

Another approach to solving the dispensing problem of a liner-free adhesive system has been described by Catchpoint® (e.g WO2009030893A1, to Cooper, et al.) in which labels are 'weakened' within the web prior to dispensing. In this scheme, the labels within the web are both shaped and weakened by perforations between each label. This 'weakening' is typically by traditional die-cutting, so that weakened self-wound material can be provided to the end user in a state ready to use and still in conventional roll form. The line of weakening for each label includes apertures which provide for engagement by a tool at the time of dispensing in order to break the weakened area and thus separate the leading label in the web for application to an article. In this scheme, the self-wound web carries the label to the dispensing point where labels are applied from the web. Whilst such schemes solve the dispensing challenge, they have seen limited adoption because the cost benefit (as discussed above) of the total solution does not justify the additional investment in new final web control and separation tools in the label applicator. On board linerless cutting systems within a label applicator such as that developed by, and branded as Monoweb®, and the ETI system described above, add a responsibility that end users have not accepted.

To carry out die cutting of Catchpoint® linerless labels, either coated with adhesive and silicone release, or by liner transfer, it is essential to either reverse the conventional format to cut through from the adhesive side, or use a process liner. Where liner transfer is used, systems have been proposed which die cut through to a clear PET liner before it is separated from the adhesive side of the web and subsequently transferred and laminated to the face of the web. This requires the die tool to cut through the transferred PET liner and the face material to itself. This has the inherent risk of damage to what becomes the finished label surface. Catchpoint® technology thereby provides perfectly repeatable label shaping to be reliably obtained.

A linerless label material and apparatus for applying labels die-cut from the linerless label material has been described by Patel in WO2007/015264 wherein the pressure sensitive adhesive is protected with a pre-formed water-soluble film wherein the thickness of the pre-formed water-soluble film ranges from 5 microns to 40 microns, preferably from 10 microns to 30 microns, more preferably from 15 microns to 20 microns. This has failed to achieve commercial success as it has proved impossible to remove a pre-formed water-soluble film of said thickness within the proposed label-cutting and application process.

In a subsequent application, US2012/061014, Patel describes the use of a water-soluble film of less than 5 microns, but none of the described coating methods provide a means to produce a water-soluble coating of said thickness. Patel further teaches in both documents die-cutting the labels in a label applicator after removal of the water soluble coating. This requires the die tool to cut through the label material from the exposed adhesive coated side.

Die-cutting through a label material from the adhesive side as taught by Patel requires the undercut of the die tool to be release coated and furthermore, it is impossible to protect the die cutting face which needs to touch the anvil to ensure cut through, reducing die life as well as in process risk of unpredictable failure.

Shibano U.S. Pat. No. 4,624,839 teaches the use of starch derivatives in a release layer for self-wound adhesive tapes wherein, however, the release layer is not removed to expose the pressure sensitive adhesive as in the present invention.

Avery Dennison describes a bottle labelling invention in US2014065334/U.S. Pat. No. 9,605,183 in which a silicone release coating on a liner is replaced with a polyvinyl alcohol water-soluble "release agent" of thickness 0.1 to 5 microns on a liner in order that the liner may be recycled after removal from "an adhesive article". Paragraph [0027] states that "A release liner is coated with an amorphous PVOH polymer layer and applied to the PSA layer so that the amorphous PVOH layer is disposed between the PSA layer and the release liner". The liner is retained in providing "an adhesive article", the application process of which to a container is not described. No "adhesive article" as described by this invention has been commercialised which reflects a number of limitations which are addressed by the present invention, including a linerless label material, and a means of removal of a water-soluble coating within an acceptable time interval.

THE PRESENT INVENTION

According to one aspect of the present invention there is provided a method of applying a linerless label to an article including the steps of
i) providing a web of joined labels having a defined shape from a web of label material wherein both liner and its release layer have been eliminated wherein the adhesive is protected by a water-soluble coating;
ii) at least partially removing the water soluble coating from the adhesive of the web of joined labels by exposure to water;
iii) applying a label from the web of joined labels to an article wherein the label is separated from the web of joined labels by separation from an adjoining label at a boundary between the label and the adjoining label.

The present invention provides a method in which a silicone coated liner is replaced by a water-soluble coating.

It may be that conversion of the web of label material is carried out by die-cutting wherein the water soluble coating provides a cushion between an anvil and die cutting means during die cutting of the web. That is to say, die-cutting is made from the face material side of the label material. The label material wherein the adhesive is protected by the water soluble coating will thus pass over a conventional anvil with no risk of binding.

The face material is cut through before the die tool cuts into the adhesive layer. Current practice for conventional labels is to cut through to the silicone release coating of the liner, ensuring that the silicone coating of between 0.6 and 1 micron is not compromised during die-cutting provoking damage to the liner, since this can lead to labels not releasing in the applicator or the liner breaking. The use of a process liner to die-cut joined labels is subject to these same limitations, hence an unpredictable number of times that a process liner can be re-used. The water soluble coating of the present invention provides a novel replacement for a silicone coated release liner, reducing the cost of production and eliminating waste liner whilst still meeting or enhancing the process tolerance demands of die-cutting.

It may be that the boundary between the label and the adjoining label is weakened, for example perforated, such that the cohesion established by the adhesive between a partially applied label and an article being labelled is sufficient to break the weakened boundary. Alternatively, the boundary between a label and an adjoining label is cut as the label is sequenced for application to the article.

It may be that the method further includes the steps of rewinding and unwinding the web of joined labels between step (i) and step (ii) and/or between step (ii) and step (iii).

It may be that the method further comprises printing a top surface of the web of label material before removing the water soluble coating.

It may be that the method further includes providing a release coating on the top surface of the web of label material or the web of joined labels derived therefrom before or after printing the front surface.

It may be that the face material is selected from paper or polymeric substrates.

It may be that the adhesive is a self adhesive, for example a pressure sensitive adhesive.

It may be that the water soluble coating is based substantially upon polyurethane or polyvinyl alcohol polymers.

It may be that the label material comprises a face material, pressure sensitive adhesive and water-soluble coating.

It may be that the water soluble coating has a thickness of 3 to 7 microns, more preferably 4 to 5 microns.

It may be that the time interval during which the web is exposed to water is less than 10 seconds, more preferably less than 5 seconds.

It may be that the temperature of the water is between 5° to 50° C., preferably 10° to 30° C., more preferably 15° to 25° C.

It may be that the water-soluble coating contains anti-counterfeit means that may be subsequently identified overtly and/or covertly.

It may be that the label material can be produced by simultaneous or sequential coating and curing of a pressure sensitive adhesive and a water-soluble coating. The selection between simultaneous or sequential coating and curing will depend upon the characteristics of the pressure sensitive adhesive and the water-soluble coating.

Simultaneous dual layer "wet-on-wet" coating provides an original use of this combination of coatings and provides a label material including the following benefits:

1. The use of dual layer coating equipment allows label face materials to be coated either by direct coating where a water-soluble coating is coated on top of a pressure sensitive adhesive, or by transfer coating from a process liner where a pressure sensitive adhesive is applied on top of a water-soluble coating, prior to lamination to a face material and rewind of the process liner.
2. The label material may be produced in wide web coating equipment at high speeds using essentially the same assets as currently used and may be subsequently slit into widths required by the label printer.
3. By this means, the manufacturer's production cost and waste disposal cost are dramatically improved over traditional label material manufacturing methods. Reduction in the caliper of face materials may also be practised in order to reduce manufacturing cost as linerless labels produced by the present method do not require the stiffness, and hence caliper, of conventional labels released from a release liner during application. Label material manufacturers are able to eliminate the use of a liner (typically a filmic liner of 19 to 30 μm thickness) and a silicone coating thereupon of 0.6 to 1.0 μm. Such a release liner is replaced in the present invention by a water-soluble coating of between 3 and 7 microns, typically 4 to 5 microns, thereby providing a substantial cost advantage.

In some embodiments, the label material, comprised of a face material, an adhesive and a water-soluble coating, is converted into joined linerless labels and the water-soluble coating removed during the printing and converting process. The use of the term "printer" or "printer/converter" in what follows is taken to mean someone who either purchases label material or manufactures label material himself, prints the upper surface of the label material, converts the label material by die-cutting the material into individual labels, and finally rewinds individual labels into reels for supply to end users and rewinds the matrix from around the die-cut labels into reels for disposal as waste. The use of the term "conversion" in the present context is taken to mean the conversion of a web of label material into reels of joined labels.

In this way, a label printer who now produces linerless label materials by coating pressure sensitive adhesives on the lower surface of the face material and a release agent on the upper surface of the face material in narrow web presses or in finishing machines can use the label material according to the present invention in a linerless system and in so doing, achieve the following advantages:

a. The procurement of these supplies—adhesives and release agents—and their related job by job set up is eliminated.
b. The support of major manufacturers of label materials who will be able to supply label materials according to the present invention (as opposed to conventional label materials) to label printers with benefit to both themselves and printer/converters thereby securing the benefits of the invention. This co-operation offers mutual security to brand owners investing in application changes required to label their products without needing to dispose of a release liner.

c. In order to practice the present invention, investment by a printer in new equipment is limited to an additional press module, or finishing unit module, within an existing press or finishing unit in which to wash off the water-soluble coating prior to matrix stripping and reel winding. Set-up times are dramatically improved as such a wash off module can be used to produce different types of label materials.

d. The printer continues to apply a varnish or release coating on top of any printing as part of the label decoration. A typical varnish or release coating for such use will include proven release agents within its formulation, in order that the finished reels of joined labels may be wound without fear of blocking.

Where the water-soluble coating is removed during the printing and converting process, the upper surface of a label material may be provided with a release coating before or after printing. Where the release coating is provided before printing, for example by the supplier of the label material, it preferably comprises a printable release coating, for example varnish formulations, which complement decoration of the linerless joined labels converted from the label material and which also act as the release coating. The use of releasable gloss or matt finish varnishes or release coatings overcomes the disadvantages of repositioning a clear release liner over the printed surface of the label material which adds cost and reduces the decoration pallet. The release life (i.e. the time during which a specified release performance is maintained) of such releasable varnishes and coatings meets current industry "Just in time logistics" at only a marginal cost premium.

In summary, the printer, having received a web of label material, is able according to the present invention to
  print and (unless a release coating has been provided before printing, for example by the supplier of label material), varnish the top surface of the web of label images wherein the varnish includes a release agent,
  die-cut the web of label images,
  remove at least in part the water-soluble coating prior to rewinding into reels of joined labels for supply to the end user,
  without requiring the use of a silicone coated release liner.

Printable release coatings have become an article of commerce and therefore it is now possible to reverse the order of release coating and printing. Inks have been developed which can be successfully cured to adhere to such printable release coatings. The present invention encourages the use of such inks by protecting the pressure sensitive adhesive with a water-soluble coating, thereby ensuring that the printable release coating on the upper surface of the label is not exposed to the pressure sensitive adhesive until the water-soluble coating has been at least in part removed. This allows the current suppliers of pressure sensitive label materials to continue to innovate since printable release coatings are only exposed to a pressure sensitive adhesive for a much shorter time. Just in time finished label supply and applications based upon new label materials, for example those according to the present invention, widen the scope for use of printable release coatings.

In one embodiment, the wash-off module removes sufficient of the water-soluble coating within the web width and frame of the printing and converting apparatus for individual label webs to be fit for subsequent application by an end user. Preferably, the wash off module provides sufficient removal of the water-soluble coating during a commercially acceptable interval to achieve sufficient activation of the adhesive prior to winding of individual label webs at low tension.

It may be that the wash-off module uses water of any temperature between 5° to 50° C., preferably 10° to 30° C., more preferably 15° to 25° C. Factors that may help to reduce the time interval required to remove at least in part the water-soluble coating within a commercially acceptable time interval may include one or more of the following:

1. The speed of dissolution of water-soluble coating.
    Different water-soluble polymers have different dissolution characteristics. As the lack of commercial acceptance of the prior art described herein has demonstrated, the use of a water-soluble coating in place of a silicone release liner has hitherto been frustrated by an inability to remove the water-soluble coating within an acceptable time interval, especially those water-soluble coatings based substantially upon polyvinyl alcohol polymers. As an example of faster dissolution, water-soluble coatings based substantially upon water-soluble polyurethane polymers such as those disclosed in WO1999/045050 have been found to dissolve more rapidly and to provide label materials offering greater cohesion between the adhesive system and an article than water-soluble coatings based substantially upon polyvinyl alcohol polymers.
2. The extent, method and orientation of the washing procedure.
    An advantage of carrying out this step within a printing press is that the wash off is applied to the full width of the printing and converting equipment as compared to carrying out the wash off at an end user in a narrow web individual reel of joined labels.
3. The extent of agitation provided at the surface of the water-soluble coating from first application of water to the water-soluble coating to the final waste stripping and winding of individual reels of labels.
4. The concentration of dissolved water-soluble polymers in the washing medium.
5. The interface and/or interaction between the pressure sensitive adhesive and the water-soluble coating. Due to the time taken to dissolve the water-soluble coating in its entirety, some part of the water-soluble coating may beneficially remain in place despite exposure to water.
6. The presence of a part of the water-soluble coating remaining in place has been found to provide unexpected benefits due to the adhesive system created at the interface between the pressure sensitive adhesive and the remaining water-soluble coating. Such an adhesive system may be created between the pressure sensitive adhesive and the remaining water-soluble coating with different types of pressure sensitive adhesives including therefore water based, solvent based and hot melt formulations.
7. The use of water-soluble polymers which solubilise at the interface particularly with water-based pressure sensitive adhesives although this is by way of example only. The water-soluble coating may be applied to the pressure sensitive adhesive, either sequentially where the pressure sensitive adhesive may be dried prior to application of the water-soluble coating, or simultaneously where both the pressure sensitive adhesive and the water-soluble coating are applied using a wet-on-wet dual coating process, by means of a direct coating process or a transfer coating process.

8. Where both pressure sensitive adhesive and water-soluble coating are applied simultaneously by a wet-on-wet dual coating process, the two coatings are preferably formulated to be sufficiently viscous to provide solubilisation at the interface without significant further penetration of one coating into the other.
9. Whether the two coatings are applied sequentially or simultaneously, the surface tensions of the two coatings are preferably adjusted so that the second coating is able to wet out completely the first coating.
10. The solubilised adhesive system developed at the interface has been found to provide sufficient cohesion between the adhesive face of a joined label converted from the label material and an article to which the label is being affixed. The cohesion may be sufficient to break the weakened boundary between the label and a following label when the article is moved with respect to the label web. The cohesion and peel strength between the label and the article is enhanced as curing of the bond takes place. Curing in this context is defined as the process during which the moisture content of any remaining water-soluble coating reduces to ambient levels.

The present invention extends the opportunities to use such a water-soluble coating by recognizing the advantages of wet on wet coating to produce a pressure sensitive label material which can be printed and where necessary release coated to support the current decorative pallet and to die cut a shaped and optionally weakened label format. The die cutting advantage obtained by employing the water-soluble coating to protect the anvil together with the inclusion of a wash off apparatus within a printing and converting process or within an offline unit, extends the potential for label material manufacturers and their customers (printer/converters) to use new printable release coatings across all formats using proven quality control procedures.

In some embodiments, the label material, comprised of a face material, an adhesive and a water-soluble coating, is converted into joined linerless labels during the printing and conversion process for supply to the end user and the water-soluble coating is removed subsequently by the end user during the label application process.

In these embodiments, the water-soluble protective coating is removed at least in part by the end user immediately prior to the application of a joined label to an article by means of a label applicator. In these embodiments, the die-cutting of the joined labels by the printer/converter is again performed before removal at least in part of the water-soluble coating.

An advantage of removing the water soluble coating during the label application process is that a release coating on the face material is no longer required.

In these embodiments, the water-soluble coating is preferably capable of removal at least in part by a wash-off module within an acceptable time interval during label application.

It may be useful to provide an illustrative example of what may be considered to be an acceptable time interval.

Labelling speeds are typically in the range of 30-1000 labels per minute. The larger the label, the slower will be the running speed of the labelling line, reflecting the longer filling times required for larger containers. If a typical label width in the Home and Personal Care sector is taken as 65 mm, and a typical label application rate of 350 labels per minute, then this indicates a web consumption speed of 22.75 meters per minute. A commercially viable labelling system needs to provide sufficient removal of the water-soluble coating to reveal sufficient adhesive tack within a path length of 1.9 meters, which in turn would indicate that the water-soluble coating needs to be removed in less than 5 seconds.

It may be that the wash-off module uses water of any temperature between 5° to 50° C., preferably 10° to 30° C., more preferably 15° to 25° C. Factors that may help to reduce the time interval required to remove at least in part the water-soluble coating within a commercially acceptable time interval may include one or more of the following:

1. The speed of dissolution of water-soluble coating. Different water-soluble polymers have different dissolution characteristics. As the lack of commercial acceptance of the prior art described above has demonstrated, the use of a water-soluble coating in place of a siliconised liner has hitherto been frustrated by an inability to remove the water-soluble coating within an acceptable time interval, especially those water-soluble coatings based substantially upon polyvinyl alcohol polymers. As an example of faster dissolution, water-soluble coatings based substantially upon water-soluble polyurethane polymers such as those disclosed in WO1999/045050 have been found to dissolve more rapidly and to contribute greater cohesion between the adhesive system and the article to be labelled than those based substantially upon polyvinyl alcohol polymers.
2. The extent, method and orientation of the washing procedure.
3. The extent of agitation provided at the surface of the water-soluble coating from first application of water to the water-soluble coating to application of the label to a container.
4. The concentration of water-soluble polymers in the washing medium.
5. The interface and/or interaction between the pressure sensitive adhesive and the water-soluble coating. Due to the time taken to dissolve the water-soluble coating in its entirety, some part of the water-soluble coating may beneficially remain in place despite exposure to water.
6. The presence of remaining water-soluble coating has been found to provide unexpected benefits due to the adhesive system created between the pressure sensitive adhesive and the solubilised remaining water-soluble coating. The presence of a part of the water-soluble coating remaining in place has been found to provide unexpected benefits due to the adhesive system created at the interface between the pressure sensitive adhesive and the remaining water-soluble coating. Any remaining water-soluble coating may fill surface irregularities in the pressure sensitive adhesive thereby creating a smoother adhesive surface and hence greater cohesion of a partially applied label to the article being labelled. Solubilisation may be enhanced by heat applied during the drying of a web of joined labels following removal of at least part of the water-soluble coating. Such an adhesive system may be created between the pressure sensitive adhesive and the remaining water-soluble coating with different types of pressure sensitive adhesives including therefore water based, solvent based and hot melt formulations.
7. The use of water-soluble polymers which solubilise at the interface particularly with water-based pressure sensitive adhesives although this is by way of example only. The water-soluble coating may be applied to the pressure sensitive adhesive, either sequentially where the pressure sensitive adhesive may be dried prior to application of the water-soluble coating, or simultaneously where both the pressure sensitive adhesive and the water-soluble coating are applied using a wet-on-wet dual coating process, by means of a direct coating process or a transfer coating process.
8. Where both pressure sensitive adhesive and water-soluble coating are applied simultaneously by a wet-on-wet dual coating process, the two coatings are preferably formulated to be sufficiently viscous to provide solubilisation at the interface without significant further penetration of one coating into the other.
9. Whether the two coatings are applied sequentially or simultaneously, the surface tensions of the two coatings are preferably adjusted so that the second coating is able to wet out completely the first coating.
10. The solubilised adhesive system developed at the interface has been found to provide sufficient cohesion between the adhesive face of a joined label converted from the label material and an article to which the label is being affixed. Where provided, the cohesion may be sufficient to break the weakened boundary between the label and a following label when the article is moved with respect to the label web. The cohesion and peel strength between the label and the article is enhanced as curing of the bond takes place. Curing in this context is defined as the process during which the moisture content of any remaining water-soluble coating reduces to ambient levels.

According to another aspect, the present invention provides a wash off apparatus to at least partially remove a water-soluble protective coating from a web of label material thereby exposing an adhesive, the apparatus consisting of a series of assemblies including:
 a) A coating removal means in which water is applied to the protective coating by washing and/or wiping means, thereby at least partially removing the exposed protective coating wherein the web travels a required distance during a pre-determined time interval with such water flow, water temperature, and level of agitation as may be necessary to at least partially remove the water-soluble coating and sufficiently expose the pressure sensitive adhesive that the label is fit for purpose.
 b) A collection means to collect the wash water containing removed water-soluble coating, replacing a part of the wash water with fresh water when required.
 c) A means, for example air flow, to remove any excess water remaining upon the face material and the pressure-sensitive adhesive.
 d) A means, for example air dryer, to dry the web at temperatures which compromise neither the printed side nor the adhesive side of the label web.
 e) Optionally, a rewinding means capable of reeling the converted webs of joined labels under variable tension control.

In another aspect, the present invention provides a self-adhesive label material and a web of joined self-adhesive labels derived therefrom, wherein the adhesive is protected by a water-soluble coating providing a cushion between an anvil and die-cutting means during die-cutting of a web into individual webs of joined labels.

In a first embodiment, the protective water-soluble coating is at least partially removed from the label material after die-cutting during the process of manufacturing individual webs of joined labels.

In a second embodiment, the protective water-soluble coating is at least partially removed after die-cutting from a web of joined labels in a labelling apparatus.

In both embodiments, contrary to the teaching of Patel in aforementioned WO2007/015624 and US2012/061014, the present invention teaches that die-cutting takes place before the water-soluble coating has been removed and that die-cutting is made from a face material side of the label material using the water-soluble coating to protect the face of an anvil against which die-cutting can be provided thereby avoiding any risk of damage to the surface of the anvil beneath the label material.

The invention in its various aspects will now be described in more detail, by way of example only, with reference to the accompanying drawings wherein.

Figure 1:
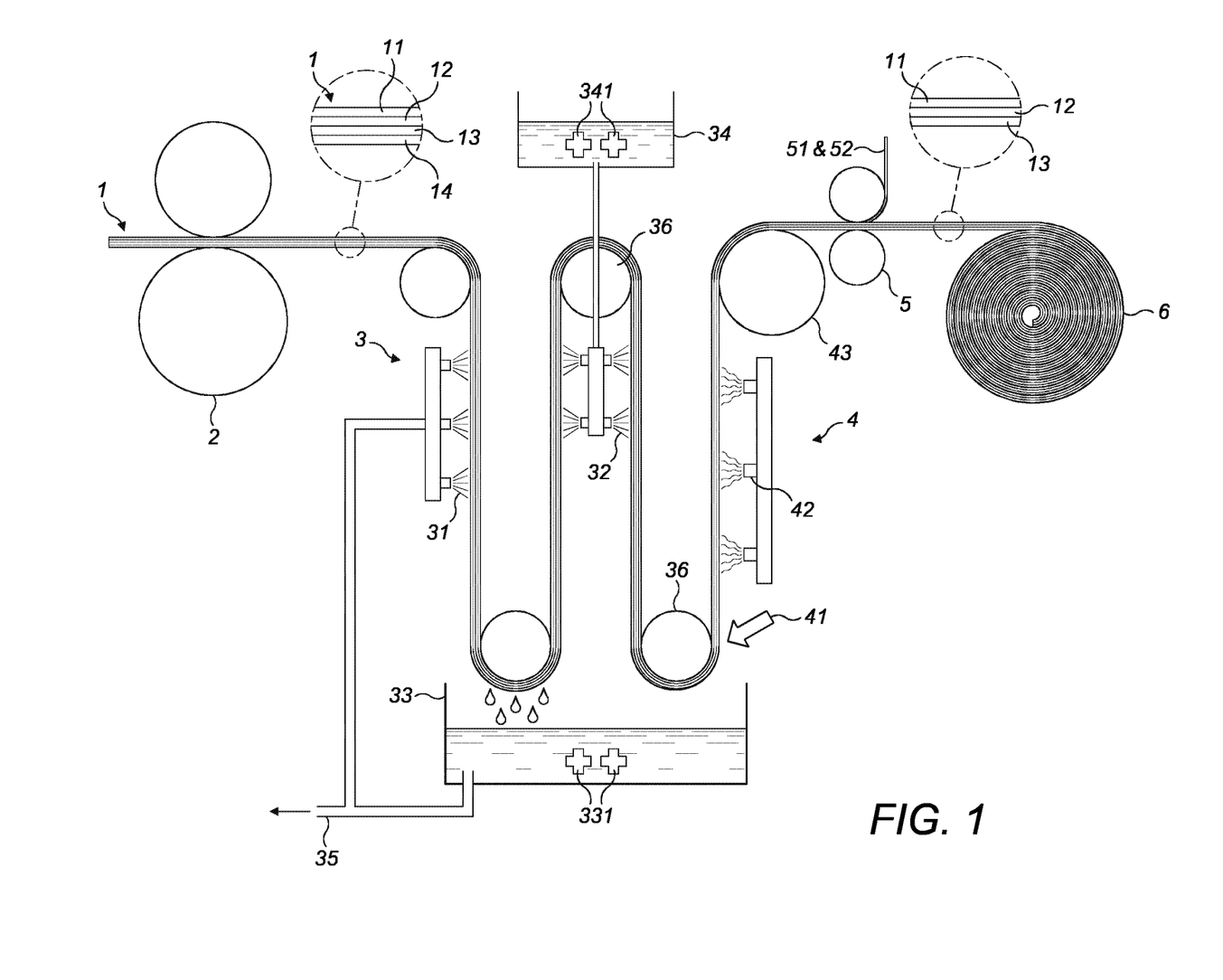
FIG. 1 shows apparatus according to a first embodiment for producing a web of joined adhesive labels in which a water soluble coating protecting the adhesive is removed and the web rewound for supply to an end user.

The first embodiment illustrated in FIG. 1 employs a printed label material (1) comprising four layers:
 A release coating (11), for example a varnish, which has been coated on the upper surface of the face material by the printer/converter following printing, or by the substrate supplier
 A face material (12), for example a paper or polymeric substrate or a combination thereof
 A pressure sensitive adhesive (13) which has been coated on the lower surface of the face material
 A water-soluble coating (14), for example a polyurethane or polyvinyl alcohol polymer, which has been coated either simultaneously or sequentially on top of the pressure-sensitive adhesive The printed label material (1) is fed through a die-cutting unit (2) where it is die-cut according to options illustrated, by way of example, in FIG. 3 and FIG. 4. In all options, the web is die cut into rows of joined labels having a defined shape and edge trim.

The web then passes through a wash off unit (3) where the water-soluble coating is removed by spraying with water. More preferably, the water soluble coating is removed by spraying first with water containing dissolved water-soluble polymer at (31) and then by spraying with fresh water at (32). The water containing dissolved water-soluble polymer is supplied from a first reservoir (33) and the fresh water is supplied from a second reservoir (34). The reservoir (33) is provided with a purge to drain (35) in order to maintain a constant circulating volume of water. Each reservoir is preferably provided with heating elements (331) and (341) respectively.

The web then passes through a drying unit (4) to remove water from the surface of the adhesive, for example using jets of air (41) and the adhesive dried, for example using heaters (42) and/or a heated final cylinder (43). Cylinder (36) and heated cylinder (43) are preferably coated with a non-stick coating to allow the unprotected adhesive to pass over them without sticking.

The web then passes through a waste-stripping unit (5) where edge waste (51) and any waste from between rows of labels (52) is removed. Finished reels of linerless joined labels with unprotected adhesive are self-wound at (6) ready for shipment to customers for application by linerless label application systems. The release coating on the face material allows the webs of linerless joined labels to be wound without sticking.

Figure 2:
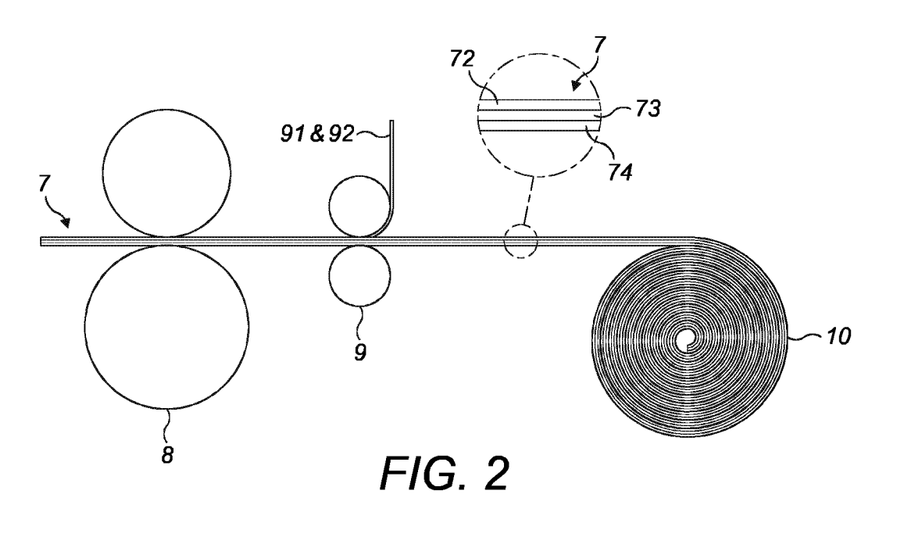
FIG. 2 shows apparatus according to a second embodiment for producing a web of joined adhesive labels in which the adhesive remains protected by a water soluble coating and the web rewound for supply to end user.
Figure 3:
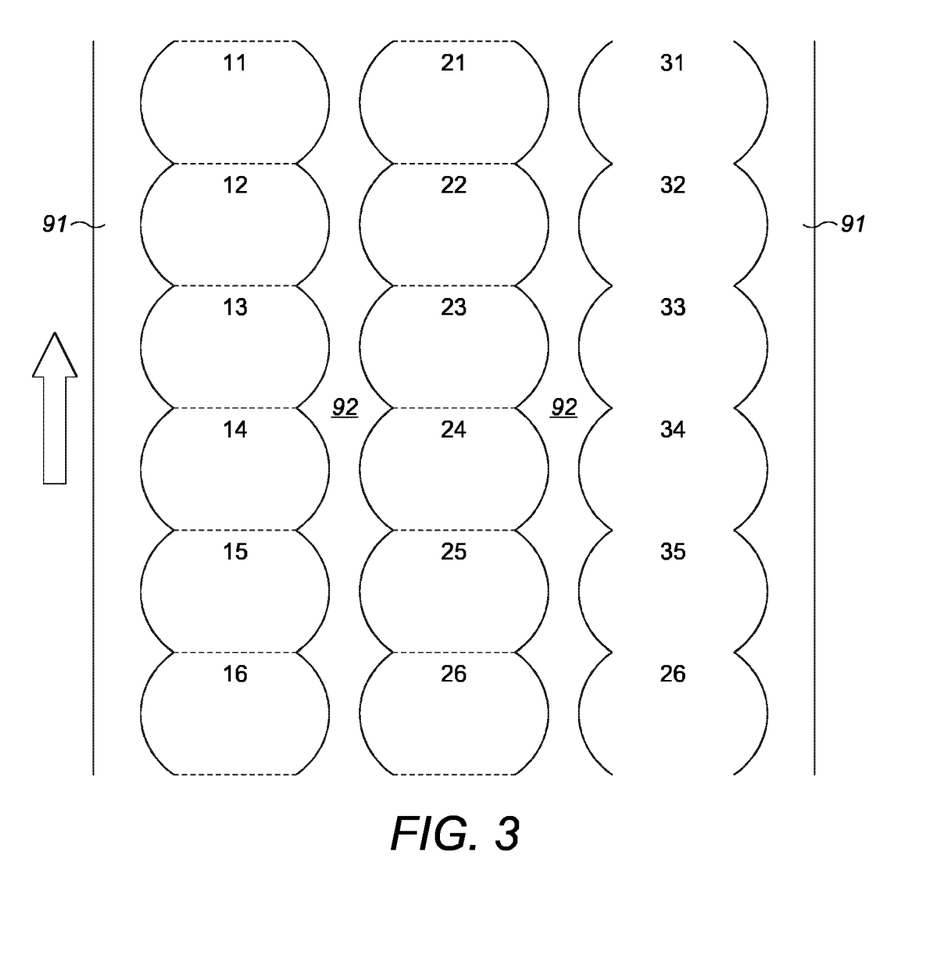
FIGS. 3 and 4 show die cutting options for producing webs of joined labels from a web of label material where the labels have a defined shape.
Figure 4:
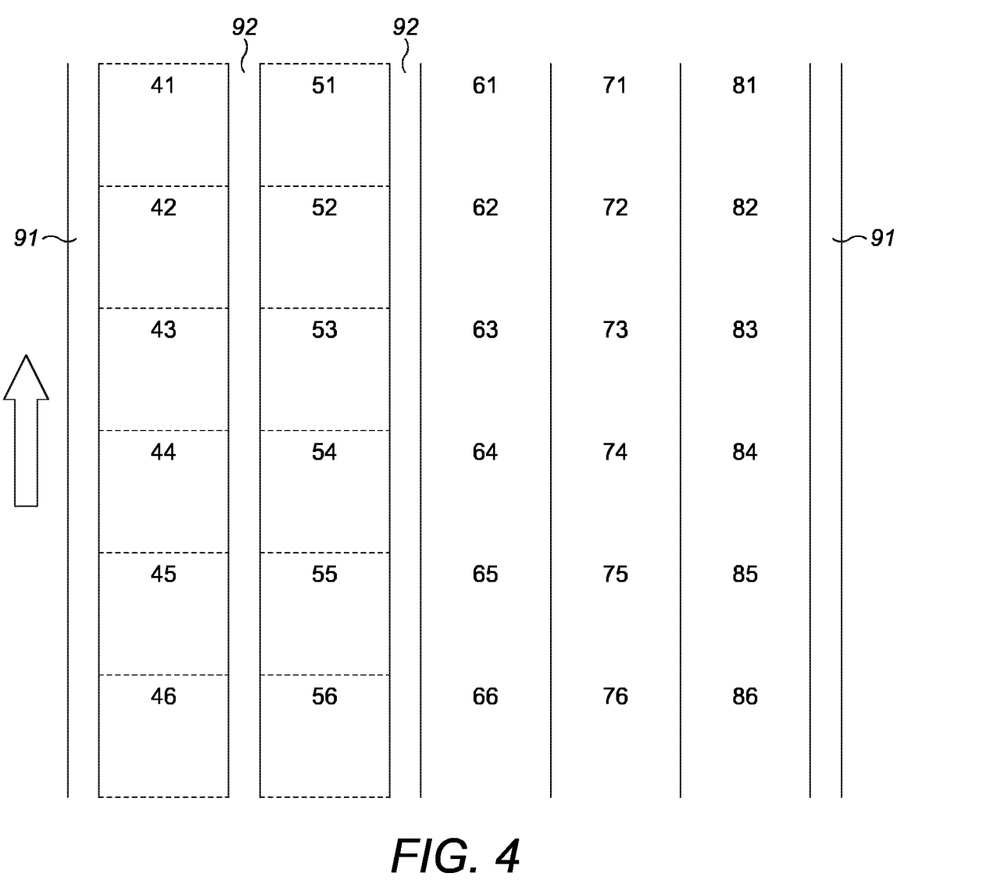

The second embodiment illustrated in FIG. 2 employs a printed label material (7) comprising three layers:
- A face material (72), for example a paper or polymeric substrate or a combination thereof
- A pressure sensitive adhesive (73) which has been coated on the lower surface of the face material
- A water-soluble coating (74), for example a polyurethane or polyvinyl alcohol polymer, which has been coated either simultaneously or sequentially on top of the pressure-sensitive adhesive The printed label material (7) is fed through a die-cutting unit (8) where it is die-cut according to options illustrated by way of example in FIG. 3 and FIG. 4. In all options, the web is die cut into rows of joined labels and edge trim.

The web then passes through a waste-stripping unit (9) where edge waste (91) and any waste from between rows of shaped labels (92) is removed. Finished reels of linerless joined labels with protected adhesive are self-wound at (10) ready for shipment to customers for application by linerless label application systems containing a wash-off unit where the water-soluble coating is removed prior to label application. The wash off unit may be similar to the wash off unit shown in FIG. 1.

FIG. 3 illustrates two die-cutting options to produce labels having a defined shape, for example with curvilinear side edges although other shapes may be employed:
- an option for introducing lines of weakening between labels in die-cutting units (2) and (8) such that shaped labels (11 thru 16 and 21 thru 26) remain joined throughout the processes illustrated in FIG. 1 and FIG. 2, facilitating separation in a label applicator.
- an option wherein no die-cutting between labels takes place in die-cutting units (2) and (8) such that shaped images (31 thru 36 and 41 thru 46) pass through the processes illustrated in FIG. 1 and FIG. 2, requiring separation to be provided within a label applicator.

Edge trim and waste from between shaped labels is removed in waste-stripping units (5) and (9) in both of the options illustrated in FIG. 3. The ease of removal of waste from between shaped images provides quality assurance that, where provided, the lines of weakening between images have been as well die-cut as the outline of the shaped image.

FIG. 4 illustrates two die-cutting options to produce labels having a defined shape, for example with linear side edges i.e rectangular:
- an option for introducing lines of weakening between labels in die-cutting units (2) and (8) such that rectangular labels (41 thru 46 and 51 thru 56) remain joined throughout the processes illustrated in FIG. 1 and FIG. 2, facilitating separation in a label applicator. In this option edge trim and waste from between rectangular labels is removed in waste-stripping units (5) and (9). The ease of removal of waste from between rectangular labels provides quality assurance that the lines of weakening between labels have been equally well die-cut.
- an option wherein no die-cutting between labels takes place in die-cutting units (2) and (8) such that rectangular labels (61 thru 66, 71 thru 76 and 81 thru 86) pass through the processes illustrated in FIG. 1 and FIG. 2, requiring separation to be provided within a label applicator. In this option, edge trim only is removed in waste-stripping units (5) and (9) as there is no need to provide waste between rectangular labels which are not joined by lines of weakening.

In all the options shown in FIGS. 3 and 4 the web of label material is die-cut from the upper or printed surface of the web and the water soluble protective coating on the lower surface of the web acts as a cushion between the anvil and the die cutting means.

The following describes one method of manufacturing and applying linerless joined labels to an article employing features of a first embodiment:
i. The process begins with the coating of adhesive to a first surface of a face material (paper or filmic substrate) as is currently done in conventional label material manufacture,
ii. As part of the same process ("simultaneous application") or in a subsequent process following drying of the pressure sensitive adhesive ("sequential application"), a water-soluble coating comprising a substantially aqueous formulation of an appropriately selected water-soluble polymer, for example a polyvinyl alcohol or a polyurethane polymer, is then applied to the open surface of the adhesive. The water-soluble coating preferably has a thickness of between 3 and 7 microns, more preferably between 4 and 5 microns.
iii. In simultaneous application, the pressure sensitive adhesive and the water-soluble coating are applied "wet-on-wet" without any drying stage in between. This encourages solubilisation to take place at the interface between the pressure sensitive adhesive and the water-soluble coating. Solubilisation may provide beneficial features after the water-soluble coating has been wholly or partially removed due to the water-soluble coating having flowed into any surface imperfections of the pressure sensitive adhesive thereby providing a smoother surface for presentation to an article. The web then passes through a drying stage during which the two "wet-on-wet" applications are dried contemporaneously, for example by passing the coated material through a dryer in which a sufficient part of the water within the water-soluble coating is removed to a point where the pressure sensitive adhesive is fit for purpose and protected, and the water-soluble coating is no longer tacky such that the label material may be wound into a roll without blocking.
iv. In sequential application, the pressure sensitive adhesive is applied "wet" and the web then passes through a drying stage during which the pressure sensitive adhesive is dried prior to application of the water-soluble coating thereupon. The web then passes through a second drying stage during which the water-soluble coating is dried, for example by passing the coated material through a dryer in which a major part of the water is removed from the coating to a point where the pressure sensitive adhesive is fully protected and the water-soluble coating is no longer tacky such that the label material may be subsequently wound into a roll without blocking.
v. Following both simultaneous and sequential application methods of manufacture, the resulting label material is then wound in a roll without fear of blocking, and may be shipped in slit widths to a printer/convertor. The water-soluble coating replaces the liner and its silicone release system of the prior art. It should be noted that a small percentage of water may remain within the water-soluble coating after drying in order to contribute to plasticisation of the coating. Since all water-soluble coatings exist in equilibrium with the moisture in the surrounding atmosphere, the percentage of water (albeit small) within the water-soluble coating will vary according to surrounding humidity levels unless proper care is taken in specifying appropriate packaging and storage conditions. In the absence of such precautions, particularly in humid environments, blocking of the roll may result.

vi. The reel is unwound at a printer and the face may be decorated with a full pallet of existing materials to provide a finished label. The print process may include printing of a release coating or printing to a pre-applied printable release coating. The release coating may comprise varnish or a siliconised system. Such printable release coatings allow self-winding of the linerless label material after the water soluble coating has been sufficiently removed. A printable release coating enhanced by the use of suitable inks may provide an attractive and commercially advantageous finish.

vii. The printed label material is die cut to form rows of joined labels having a defined shape. The web of joined labels may be locally weakened between adjoining labels, for example perforated, using for example a rotating die, to create weakened areas at the boundaries between adjoining labels, thereby reducing the force required to separate a label from the immediately following label in a label applicator.

viii. The water-soluble coating is at least partially removed in a "wash-off module" within the printing press prior to winding reels of linerless joined labels for subsequent application to an article in a label applicator.

ix. At the dispensing point, the labels are separated either by breaking the lines of weakness between adjoining labels provided during the label converting process or by cutting at the boundaries of adjoining labels, and are then continuously applied to an article.

The following describes one method of manufacturing and applying linerless labels to an article employing features of a second embodiment:

i. The process begins with the coating of adhesive to a first surface of a face material (paper or filmic substrate) as is currently done in conventional label material manufacture, ii. As part of the same process ("simultaneous application") or in a subsequent process following drying of the pressure sensitive adhesive ("sequential application"), a water-soluble coating comprising a substantially aqueous formulation of an appropriately selected water-soluble polymer, for example a polyvinyl alcohol or a polyurethane polymer, is then applied to the open surface of the adhesive. The water-soluble coating preferably has a thickness of between 3 and 7 microns, more preferably between 4 and 5 microns.

iii. In simultaneous application, the pressure sensitive adhesive and the water-soluble coating are applied "wet-on-wet" without any drying stage in between. This encourages solubilisation to take place at the interface between the pressure sensitive adhesive and the water-soluble coating. Solubilisation may provide beneficial features after the water-soluble coating has been wholly or partially removed due to the water-soluble coating having flowed into any surface irregularities of the pressure sensitive adhesive thereby providing a smoother surface for presentation to an article. The web then passes through a drying stage during which the two "wet-on-wet" applications are dried contemporaneously, for example by passing the coated material through a dryer in which a sufficient part of the water within the water-soluble coating is removed to a point where the pressure sensitive adhesive is fit for purpose and protected, and the water-soluble coating is no longer tacky such that the label material may be wound into a roll without blocking.

iv. In sequential application, the pressure sensitive adhesive is applied "wet" and the web then passes through a drying stage during which the pressure sensitive adhesive is dried prior to application of the water-soluble coating thereupon. The web then passes through a second drying stage during which the water-soluble coating is dried, for example by passing the coated material through a dryer in which a major part of the water is removed from the coating to a point where the pressure sensitive adhesive is fully protected and the water-soluble coating is no longer tacky such that the label material may be subsequently wound into a roll without blocking.

v. Following both simultaneous and sequential application methods of manufacture, the resulting label material is then wound in a roll without fear of blocking, and can be shipped in slit widths to a printer/convertor. The water-soluble coating replaces the liner and its silicone release system of the prior art. It should be noted that a small percentage of water may remain within the water-soluble coating after drying in order to contribute to plasticisation of the coating. Since all water-soluble coatings exist in equilibrium with the moisture in the surrounding atmosphere, the percentage of water (albeit small) within the water-soluble coating will vary according to surrounding humidity levels unless proper care is taken in specifying appropriate packaging and storage conditions. In the absence of such precautions, particularly in humid environments, blocking of the roll may result.

vi. The reel is unwound at a printer and the face may be decorated with a full pallet of existing materials to provide a finished label. The print process may include printing of a releasable varnish or varnishes, or printing to a pre-applied printable release coating vii. The printed label material is die cut to form webs of joined labels having a defined shape and self-wound to form reels of joined labels for subsequent application to an article. The web of joined labels may be locally weakened between adjoining labels, for example perforated, using for example a rotating die, to create a web of joined labels which by way of example, may be defined by weakened areas at the boundaries of adjoining labels, thereby reducing the force required to separate a label from the immediately following label.

viii. In the end user's packaging line, the water soluble protective coating is at least partially removed within a "wash-off module" which can be positioned adjacent to a proven linerless label applicator.

ix. The web, now with open adhesive is fed into a linerless label applicator. At the dispensing point, the labels are separated either by breaking the lines of weakness between adjoining labels where provided during the label converting process or by cutting at the boundaries of adjoining labels, and are then continuously applied to the article.

The methods of both embodiments employ a wash-off apparatus to at least partially remove a water-soluble protective coating from a linerless web of joined labels to expose an adhesive.

The wash off apparatus may comprise the following components:
a. A coating removal means in which water is applied to the protective water-soluble coating by washing and/or wiping means, thereby at least partially removing the exposed protective coating wherein the web travels a required distance during a pre-determined time interval with such water flow, water temperature, and level of agitation as may be necessary to at least partially remove the water-soluble coating and sufficiently expose the pressure sensitive adhesive that the web of label material is fit for purpose.
b. A collection means to collect and optionally re-use the wash water containing removed water-soluble coating, and replacing a part of the wash water with fresh water when required.
c. Means, for example air flow means, to remove any excess water remaining upon the face material and the pressure-sensitive adhesive.
d. Means, for example a heated air flow, to dry the web at temperatures which compromise neither the printed side nor the adhesive side of the web of label material.

Within the wash off apparatus, the web is controlled through a support assembly with the water-soluble coating exposed to water varying in volume and application intensity depending upon the speed of the linerless label web, causing the water-soluble coating to at least partially dissolve, thereby exposing at least partially the pressure sensitive adhesive. In an alternative arrangement, exposure to a water spray or a washing procedure provided for example by rotating sponges or brushes, is divided into two sequential operations. In a first operation, the water spray or wash is provided by means of a circulating flow of water which may contain dissolved water-soluble coating from previous washing of the linerless label web. In a second sequential operation, the flow of water is fresh feed without any dissolved water-soluble coating thereby providing a rinsing means. A part of the water from the second operation is subsequently used to replace that volume of water purged to drain from the first operation in order to reduce the concentration of dissolved water-soluble polymer and/or water-soluble adhesive The temperature of the water used for removing at least partially the protective water-soluble coating may be between 5° to 50° C., preferably 10° to 30° C., more preferably 15° to 25° C. The web of label material within which a weakened boundary may have been die-cut between adjoining labels is preferably dried in a dryer or series of dryers at temperature preferably ranging from 15° C. to 125° C., preferably from 30° C. to 90° C., more preferably from 45° C. to 75° C.

In summary, the present invention provides a linerless labelling method which eliminates both the liner and its release means and provides an apparatus which is able to process linerless joined labels converted from a label material for application of the labels to an article thereby addressing the limitations of prior art teachings.

The present invention provides a linerless labelling system in which a water-soluble coating protecting a pressure sensitive adhesive may be at least partially removed within a commercially acceptable time interval whilst maintaining sufficient cohesion between the adhesive face of an at least partially applied label and an article such that, where provided, the weakened boundary between the label and a following label is broken when the article is moved with respect to the label web, thus enabling substantial cost and environmental benefits to be realised without the need for significant capital investment.

A further benefit of the present invention is that it allows the use of a thinner face material and a lower coat weight of pressure sensitive adhesive, both providing additional cost savings. Conventional die cutting requires face materials of greater thickness than those required by the present invention and adhesive coat weights greater than those required by the present invention in order to avoid strikethrough, i.e. damaging the liner and leading to web breaks.

In the light of the foregoing, it will be understood that the water-soluble coating should protect the adhesive sufficiently to provide a surface which, after drying, does not cause blocking of the adhesive when the label material is wound in a roll. The term blocking should be understood in this context to mean that the adhesive is insufficiently protected to prevent it from adhering to the face material when the label material is wound in a roll. Blocking indicates that the adhesive is under-protected. Under-protection may be mitigated by incorporating polymers which when dried provide a harder, less tacky, surface to the water-soluble coating.

However, it should be equally understood that the adhesive should not be over-protected by the water-soluble coating such that the water-soluble coating cannot be sufficiently dissolved within a commercially acceptable time interval. It will also be understood that the water-soluble coating may comprise formulations based not only upon water-soluble polymers but also upon water-soluble adhesives such as those containing dextrin, starch, gum Arabic, acacia gum, and/or gelatin although these examples of water-soluble adhesives should not be taken as limiting.

In a further feature common to all embodiments, the water-soluble coating may include security features including taggants and/or soluble or dispersible chemical compounds of different types, together described here as "markers". The markers are first dispersed in an aqueous formulation and said aqueous formulation is added to the coating solution or dispersion of water-soluble or water-dispersible polymer(s) and mixed thoroughly to ensure uniform dispersion of markers within the coating solution or dispersion prior to being coated upon the pressure sensitive adhesive. The purpose of including security markers within the water-soluble coating is to provide anti-counterfeit and/or grey market identification. Anti-counterfeit identification enables the brand owner, the wholesaler, retailer or purchaser to identify that the product is genuine. Grey market identification enables the brand owner to trace by which route his or her branded product has travelled prior to sale.

Detection of the markers may be made by a wide variety of means including ultra-violet light of different wavelengths, infra-red light of different wavelengths, In the case of "clear on clear" labels where the entire label is transparent (water white), the markers may be identified overtly by examining the external appearance of the label by means of appropriate detection equipment. Where covert identification is required, an opaque face material may be provided wherein the label needs first to be removed in order to determine the presence of markers within the residual water-soluble coating.

It is recognized that a part of the anti-counterfeit means will be lost to the wash water when the at least part of the water-soluble coating is removed. If insufficient anti-counterfeit means remain after the removal of at least part of the water-soluble coating to ensure reliable detection, an alternative method is to embed the anti-counterfeit means in a water-soluble coating applied to either side of the face material prior to coating with adhesive, or in the adhesive itself.

The present invention, as compared to other linerless labelling methods, has the added advantage of using the existing supply chain, proven materials and proven adhesive expertise. The printer, whether by in-house coating of varnishes or siliconised release coatings or by using transfer of a clear release liner, is also able to match all current decorative requirements to maintain or enhance relations with brands and end users. With elimination of liner and cross web matrix from current die cutting practice, the printer's own waste levels are reduced. The lower cost of the label material reduces his set up costs and lowers his working capital requirements. The printer can justify investment in removing the water soluble coating within the press or in an offline unit given the lower cost of input material and the opportunity to develop decorative release coating systems to facilitate the adoption of linerless labelling by his customer.

The producers of printing presses seeking to develop linerless joined label conversion options can now focus on the use of a "wash off module" to provide wash off and drying of the water-soluble coating as opposed to separate stations to apply release coatings and process liner controls through die cutting modules.

The packer and brand owner may now evaluate investment in linerless label application equipment using options introduced by the present invention. The end user can thereby justify an investment in proven linerless label application systems and the graphic pallet for decoration is not compromised.

In summary, the present invention provides a method of manufacturing linerless label material which eliminates both the liner and its silicone release means, provides the current supply chains of manufacturers of label materials and printer/converters, as well as the printing press and converting equipment suppliers, the means to develop their offering by exploiting the present invention and claims with less cost and less waste.

The present invention provides manufacturers of label materials with an opportunity to add printable release coatings to the top surface of a label material and provides ink manufacturers with an opportunity to extend the use of varnishes containing one or more release agents.

According to another aspect, the present invention provides a method of manufacturing linerless self-adhesive label material in a continuous process wherein adhesive provided within a web of label material is protected by a water-soluble coating which is at least partially removed by exposure to water during conversion of the material into reels of labels and wherein the face of the label material is coated with a release coating before or after conversion such that the reel of linerless labels may subsequently be self-wound.

It may be that the protective coating comprises substantially a water-soluble polymer. Alternatively, the protective coating comprises substantially a water-activated adhesive.

It may be that the protective coating has a thickness of less than 3 to 7 microns, more preferably 4 to 5 microns It may be that the release coating is printable without the print being damaged by the adhesive as a result of self-winding.

It may be that the time interval during which the web of printed label material is exposed to water is less than 10 seconds, more preferably less than 5 seconds.

It may be that the temperature of the water is between 5° to 50° C., preferably 10° C. to 30° C. more preferably 15° C. to 25 C.

It may be that the water-soluble coating provides a cushion between the anvil and the die cutting means It may be that the label web is weakened before the at least partial removal of the water-soluble coating such that the cohesion established by the adhesive between an at least partially applied label converted from the label material and the article to be labelled is sufficient to break the weakened boundary between the label and a following label when the article is moved with respect to the label web.

It may be that the web of label material has been manufactured by coating a face material with adhesive and water-soluble protective coating sequentially.

It may be that the web of label material has been manufactured by coating a face material with adhesive and water-soluble protective coating simultaneously.

It may be that the water-soluble coating contains anti-counterfeit means that may be subsequently identified overtly and/or covertly.

It may be that a wash off apparatus is employed during conversion of a linerless label material in order to at least partially remove a water-soluble protective coating from the web thereby exposing the adhesive, the apparatus consisting of a series of assemblies including:

a) A coating removal means in which water is applied to the protective coating by washing and/or wiping means, thereby at least partially removing the exposed protective coating wherein the web travels a required distance during a pre-determined time interval with such water flow, water temperature, and level of agitation as may be necessary to at least partially remove the water-soluble coating and sufficiently expose the pressure sensitive adhesive that the label is fit for purpose.

b) A collection means to collect the wash water containing removed water-soluble coating, replacing a part of the wash water with fresh water when required.

c) A means, for example an air flow, to remove any excess water remaining upon the face material and the pressure-sensitive adhesive.

d) A means, for example an air dryer, to dry the web at temperatures which compromise neither the printed side nor the adhesive side of the label web.

e) Optionally, a rewinding means capable of reeling the converted webs of joined labels under variable tension control.

It may be that the temperature of the water used for removing at least partially the protective coating is between 5° to 50° C., preferably 10° C. to 30° C. more preferably 15° C. to 25 C.

It may be that the label web is dried in a dryer or series of dryers at temperature ranging from 15° C. to 125° C., preferably from 30° C. to 90° C., more preferably from 45° C. to 75° C.

According to another aspect, the present invention provides a method of applying a linerless label to an article in a continuous process wherein adhesive provided within a web of label material is protected by a water-soluble coating which is at least partially removed by exposure to water prior to application of a label and wherein the label web may be weakened such that the cohesion established by the adhesive between an at least partially applied label and the article is sufficient to break the weakened boundary between the label and a following label when the article is moved with respect to the label web.

It may be that the protective coating comprises substantially a water-soluble polymer. Alternatively, the protective coating comprises substantially a water-activated adhesive.

It may be that a web of pre-weakened labels is singulated and attached to an article without the use of a release agent or an intermediate liner.

It may be that the protective coating has a thickness of 3 to 7 microns, more preferably 4 to 5 microns.

It may be that the label web is weakened prior to at least partial removal of the protective coating.

It may be that the label web is weakened following at least partial removal of the protective coating.

It may be that the adhesive is pressure sensitive.

It may be that the time interval during which the label web is exposed to water is less than 10 seconds, more preferably less than 5 seconds.

It may be that the temperature of the water is between 5° C. to 50° C., preferably 10° C. to 30° C. more preferably 15° C. to 25 C.

According to another aspect of the invention there is provided an apparatus to at least partially remove a water-soluble protective coating from a linerless label web to expose an adhesive and prepare the linerless label for application of a label to an article by a linerless labelling machine, the apparatus consisting of a series of assemblies including:
a) A coating removal means in which water is applied to the protective coating by washing and/or wiping and/or rubbing means, thereby at least partially removing the exposed protective coating wherein the web travels a required distance during a pre-determined time interval with such water flow, water temperature, and level of agitation as may be necessary to at least partially remove the water-soluble coating and sufficiently expose the pressure sensitive adhesive for adequate cohesion to the article.
b) A collection means to collect the wash water containing removed water-soluble coating, replacing a part of the wash water with fresh water when required.
c) A means of removing any water remaining upon the face material and the pressure-sensitive adhesive.
d) A means of drying the web to a moist condition at temperatures which compromise neither the printed side of the label web nor the blend of pressure sensitive adhesive and residual water-soluble coating or adhesive in order to regain sufficient cohesive performance from the exposed blend of pressure sensitive adhesive and residual water-soluble coating or adhesive.

It may be that the temperature of the water used for removing at least partially the protective coating is between 5° to 50° C., preferably 10° C. to 30° C. more preferably 15° C. to 25 C.

It may be that the article with affixed label is dried in a dryer or series of dryers at temperature ranging from 15° C. to 125° C., preferably from 30° C. to 90° C., more preferably from 45° C. to 75° C.

The invention claimed is:

1. A method of applying a linerless label to an article including the sequential steps of:
   i) providing a web of joined labels wherein both a liner and its release layer have been eliminated, the web having an adhesive protected by a water-soluble coating;
   ii) cutting the web of label material into a defined shape with the water-soluble coating in place such that the water-soluble coating provides a cushion between an anvil and a cutting device during cutting of the web then;
   iii) at least partially removing the water-soluble coating from the adhesive of the web of joined labels by exposure to water after cutting of the web and then;
   iv) applying a label from the cut web of joined labels to an article wherein the label is separated from the web of joined labels by separation from an adjoining label at a boundary between the label and the adjoining label.

2. The method of claim 1 wherein conversion of the web of label material is carried out by die-cutting.

3. The method of claim 1 wherein the boundary between the label and the adjoining label is weakened, such that cohesion established by the adhesive between a partially applied label and an article being labelled is sufficient to break the weakened boundary.

4. The method of claim 1 wherein the boundary between a label and an adjoining label is cut as the label is sequenced for application to an article being labelled.

5. The method of claim 1 further including the steps of rewinding and unwinding the web of joined labels between step (i) and step (iii) and/or between step (iii) and step (iv).

6. The method of claim 1 further comprising printing a top surface of the web of label material before removing the water-soluble coating.

7. The method of claim 6 further including providing a release coating on the top surface of the web of label material or the web of joined labels derived therefrom before or after printing the top surface.

8. The method of claim 6 wherein the label material is selected from paper or polymeric substrates.

9. The method according to claim 1 wherein the adhesive is a self adhesive pressure sensitive adhesive.

10. The method according to claim 1 wherein the water-soluble coating is based upon polyurethane or polyvinyl alcohol polymers.

11. The method according to claim 1 wherein the water-soluble coating has a thickness of 3 to 7 microns.

12. The method according to claim 1 wherein the time interval during which the web is exposed to water is less than 10 seconds.

13. The method according to claim 1 wherein the temperature of the water is between 5° to 50° C.

14. The method according to claim 1 wherein the water-soluble coating contains anti-counterfeit means that may be subsequently identified overtly and/or covertly.

15. The method according to claim 1 wherein the water-soluble coating has a thickness of 4 to 5 microns.

16. The method according to claim 1 wherein the time interval during which the web is exposed to water is less than 5 seconds.

17. The method according to claim 1 wherein the temperature of the water is between 10° to 30° C.

18. The method according to claim 1 wherein the temperature of the water is between 15° to 25° C.

19. The method according to claim 1 wherein the adhesive and the water-soluble protective coating are applied to the face material by dual coating.

20. A wash off apparatus to at least partially remove a water-soluble protective coating from a web of die-cut label material thereby exposing an adhesive, the apparatus comprising a series of assemblies in the following sequence:
   (a) A die-cutting unit for cutting the web of label material into a defined shape with the water-soluble protective coating in place such that the water-soluble coating provides a cushion between an anvil and a cutting device during cutting of the web, followed by;

(b) A water soluble protective coating removal unit in which water is applied to the protective coating by washing and/or wiping means, thereby at least partially removing the exposed protective coating from the web of die-cut label material, wherein the cut web travels a required distance during a pre-determined time interval with such water flow, water temperature, and level of agitation as may be necessary to at least partially remove the water-soluble coating and sufficiently expose the adhesive on the web of joined labels, followed by;

(c) A collection unit to collect the wash water containing removed water-soluble coating, replacing a part of the wash water with fresh water when required, followed by;

(d) A drying unit creating an air flow, to initially remove any excess water remaining upon the face material and the adhesive, followed by;

(e) The drying unit to subsequently dry the web at temperatures which compromise neither the printed side nor the adhesive side of the label web, followed by;

(f) A rewinding apparatus capable of reeling the converted webs of joined labels under variable tension control.

\* \* \* \* \*